US012529842B2

(12) United States Patent
Chen et al.

(10) Patent No.: US 12,529,842 B2
(45) Date of Patent: Jan. 20, 2026

(54) OPTICAL TRANSMISSION SYSTEM AND DATA COMMUNICATION SYSTEM

(71) Applicant: Alibaba (China) Co., Ltd., Hangzhou (CN)

(72) Inventors: Sai Chen, Beijing (CN); Chongjin Xie, Morganville, NJ (US); Huan Zhang, Beijing (CN); Liang Dou, Beijing (CN); Rui Lu, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 334 days.

(21) Appl. No.: 18/062,269

(22) Filed: Dec. 6, 2022

(65) Prior Publication Data

US 2023/0194779 A1 Jun. 22, 2023

(30) Foreign Application Priority Data

Dec. 16, 2021 (CN) .......................... 202111558410.4

(51) Int. Cl.
*G02B 6/12* (2006.01)
*H04B 10/61* (2013.01)
(52) U.S. Cl.
CPC ....... *G02B 6/12007* (2013.01); *H04B 10/614* (2013.01); *G02B 2006/12164* (2013.01)
(58) Field of Classification Search
CPC ...... G02B 6/12007; G02B 2006/12164; H04B 10/614
See application file for complete search history.

(56) References Cited

U.S. PATENT DOCUMENTS

| | | | | |
|---|---|---|---|---|
| 5,905,838 A | * | 5/1999 | Judy | G02B 6/03644 385/100 |
| 6,307,668 B1 | * | 10/2001 | Bastien | H01S 3/06754 359/341.5 |
| 6,310,716 B1 | * | 10/2001 | Evans | H04B 10/2916 398/79 |
| 6,469,826 B1 | * | 10/2002 | Masuda | H04B 10/294 359/337.2 |
| 6,618,193 B1 | * | 9/2003 | Boertjes | H04B 10/291 359/337.2 |
| 6,867,912 B2 | * | 3/2005 | Hwang | H01S 3/067 359/341.1 |

(Continued)

FOREIGN PATENT DOCUMENTS

| | | |
|---|---|---|
| CN | 110011732 A | 7/2019 |
| CN | 111596409 A | 8/2020 |

(Continued)

OTHER PUBLICATIONS

Search Report issued in corresponding Chinese Application No. 202111558410.4 on Aug. 2, 2023 (1 page).

*Primary Examiner* — Peter Radkowski
(74) *Attorney, Agent, or Firm* — Finnegan, Henderson, Farabow, Garrett & Dunner, LLP

(57) ABSTRACT

An optical transmission system is provided. The optical transmission system includes a first board card including a multiplexer/demultiplexer, and an optical amplifier. The multiplexer/demultiplexer is configured to receive a plurality of first split optical signals and combine the received plurality of first split optical signals into a first combined optical signal, and the optical amplifier is configured to amplify power of the first combined optical signal.

9 Claims, 6 Drawing Sheets

(56) References Cited

U.S. PATENT DOCUMENTS

| | | | | |
|---|---|---|---|---|
| 7,046,872 B2* | 5/2006 | Sakuma | G02F 1/3137 | 385/21 |
| 7,389,043 B2* | 6/2008 | Bernier | H04J 14/0295 | 398/68 |
| 7,423,804 B2* | 9/2008 | Al-Salameh | H04B 10/07955 | 359/337 |
| 7,555,215 B2* | 6/2009 | Nakamura | H04J 14/0294 | 398/31 |
| 7,657,175 B2* | 2/2010 | Nagaki | H04B 10/07955 | 398/20 |
| 7,768,697 B2* | 8/2010 | Al-Salameh | H01S 3/06754 | 359/333 |
| 8,515,288 B2* | 8/2013 | Izumi | H04J 14/086 | 398/160 |
| 9,608,758 B1* | 3/2017 | Zhao | H04J 14/0223 | |
| 9,825,726 B2* | 11/2017 | Bolshtyansky | H04B 10/291 | |
| 9,967,051 B2* | 5/2018 | Zhang | H04B 10/80 | |
| 10,826,613 B1* | 11/2020 | Liang | B60G 3/00 | |
| 10,892,830 B1* | 1/2021 | Liang | B60G 21/05 | |
| 11,063,684 B2* | 7/2021 | Karube | H04J 14/0271 | |
| 11,165,529 B2* | 11/2021 | Yamamoto | H04Q 11/0005 | |
| 11,381,313 B2* | 7/2022 | Liang | H01S 5/021 | |
| 11,791,899 B2* | 10/2023 | Liang | B60G 15/02 | 385/9 |
| 11,916,522 B2* | 2/2024 | Zurek | H03F 3/245 | |
| 11,923,651 B2* | 3/2024 | Foursa | H01S 3/06766 | |
| 12,128,729 B2* | 10/2024 | Liang | H04B 10/40 | |
| 2002/0015552 A1* | 2/2002 | Link | G02B 6/29358 | 385/24 |
| 2003/0058526 A1* | 3/2003 | Kakui | H01S 3/06758 | 359/341.3 |
| 2003/0206334 A1* | 11/2003 | Hwang | H01S 3/2383 | 359/341.5 |
| 2003/0210855 A1* | 11/2003 | Sakuma | G02F 1/3137 | 385/21 |
| 2004/0075891 A1* | 4/2004 | Hwang | H01S 3/067 | 359/341.5 |
| 2005/0094998 A1* | 5/2005 | Bernier | H04J 14/0295 | 398/19 |
| 2006/0062576 A1* | 3/2006 | Nakamura | H04J 14/0227 | 398/72 |
| 2006/0072188 A1* | 4/2006 | Al-Salameh | H01S 3/06754 | 359/337 |
| 2007/0212066 A1* | 9/2007 | Winh | H04Q 11/0062 | 398/45 |
| 2007/0230953 A1* | 10/2007 | Nagaki | H04B 10/07955 | 398/5 |
| 2009/0003767 A1* | 1/2009 | Al-Salameh | H04B 10/077 | 385/24 |
| 2009/0136239 A1* | 5/2009 | Izumi | H04J 14/086 | 398/147 |
| 2009/0269079 A1* | 10/2009 | Izumi | H04J 14/086 | 398/147 |
| 2010/0034532 A1* | 2/2010 | Ghelfi | H04J 14/0219 | 398/19 |
| 2010/0260496 A1* | 10/2010 | Tosetti | H04J 14/0297 | 398/91 |
| 2017/0214483 A1* | 7/2017 | Bolshtyansky | H04B 10/616 | |
| 2017/0214484 A1* | 7/2017 | Zhang | H04B 10/294 | |
| 2019/0222345 A1* | 7/2019 | Karube | H04J 14/0209 | |
| 2021/0175973 A1* | 6/2021 | Liang | H01S 5/12 | |
| 2021/0194616 A1* | 6/2021 | Yamamoto | H04J 14/0291 | |
| 2021/0367568 A1* | 11/2021 | Zurek | H04L 25/08 | |
| 2021/0376550 A1* | 12/2021 | Foursa | H01S 3/06766 | |
| 2022/0416900 A1* | 12/2022 | Liang | B60G 21/05 | |
| 2024/0149632 A1* | 5/2024 | Liang | B60G 3/00 | |
| 2024/0178629 A1* | 5/2024 | Foursa | H01S 3/0677 | |
| 2025/0070880 A1* | 2/2025 | Liang | H01S 5/12 | |

FOREIGN PATENT DOCUMENTS

| | | |
|---|---|---|
| CN | 214756746 U | 11/2021 |
| JP | H10145336 A | 5/1998 |

* cited by examiner

OPTICAL TRANSMISSION SYSTEM AND DATA COMMUNICATION SYSTEM

CROSS-REFERENCE TO RELATED APPLICATIONS

The disclosure claims the benefits of priority to Chinese Application No. 202111558410.4, filed on Dec. 16, 2021, which is incorporated herein by reference in its entirety.

TECHNICAL FIELD

The present disclosure generally relates to communication technologies, and more particularly, to optical transmission systems and data communication systems.

BACKGROUND

With the rapid development of technology, requirements for bandwidth in a network also increases rapidly. Between data centers, the optical transmission technology is usually used for realizing data interconnection. The optical transmission technology refers to a technology of performing data transmission in the form of optical signals between data centers. However, the current optical transmission technology is suitable for a center network scenario and not suitable for an edge network scenario.

SUMMARY OF THE DISCLOSURE

Embodiments of the present disclosure provide an optical transmission system. The optical transmission system includes a first board card including a multiplexer/demultiplexer and an optical amplifier. The multiplexer/demultiplexer is configured to receive a plurality of first split optical signals and combine the received plurality of first split optical signals into a first combined optical signal, and the optical amplifier is configured to amplify power of the first combined optical signal.

Embodiments of the present disclosure provide a data communication system. The data communication system includes at least one data center. The data center includes at least one terminal, a photoelectric conversion device communicatively connected to the at least one terminal respectively, and an optical transmission system. The optical transmission system includes a first board card, a multiplexer/demultiplexer, and an optical amplifier. Both the multiplexer/demultiplexer and the optical amplifier are arranged on the first board card. The multiplexer/demultiplexer is configured to receive a plurality of first split optical signals and combine the received plurality of first split optical signals into a first combined optical signal, and the optical amplifier is configured to amplify power of the first combined optical signal.

Embodiments of the present disclosure provide an optical transmission system. The optical transmission system includes a first board card including a multiplexer/demultiplexer, and an optical amplifier. The optical amplifier is configured to receive a second combined optical signal sent externally and amplify power of the second combined optical signal, and the multiplexer/demultiplexer is configured to split the power-amplified second combined optical signal into a plurality of second split optical signals.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
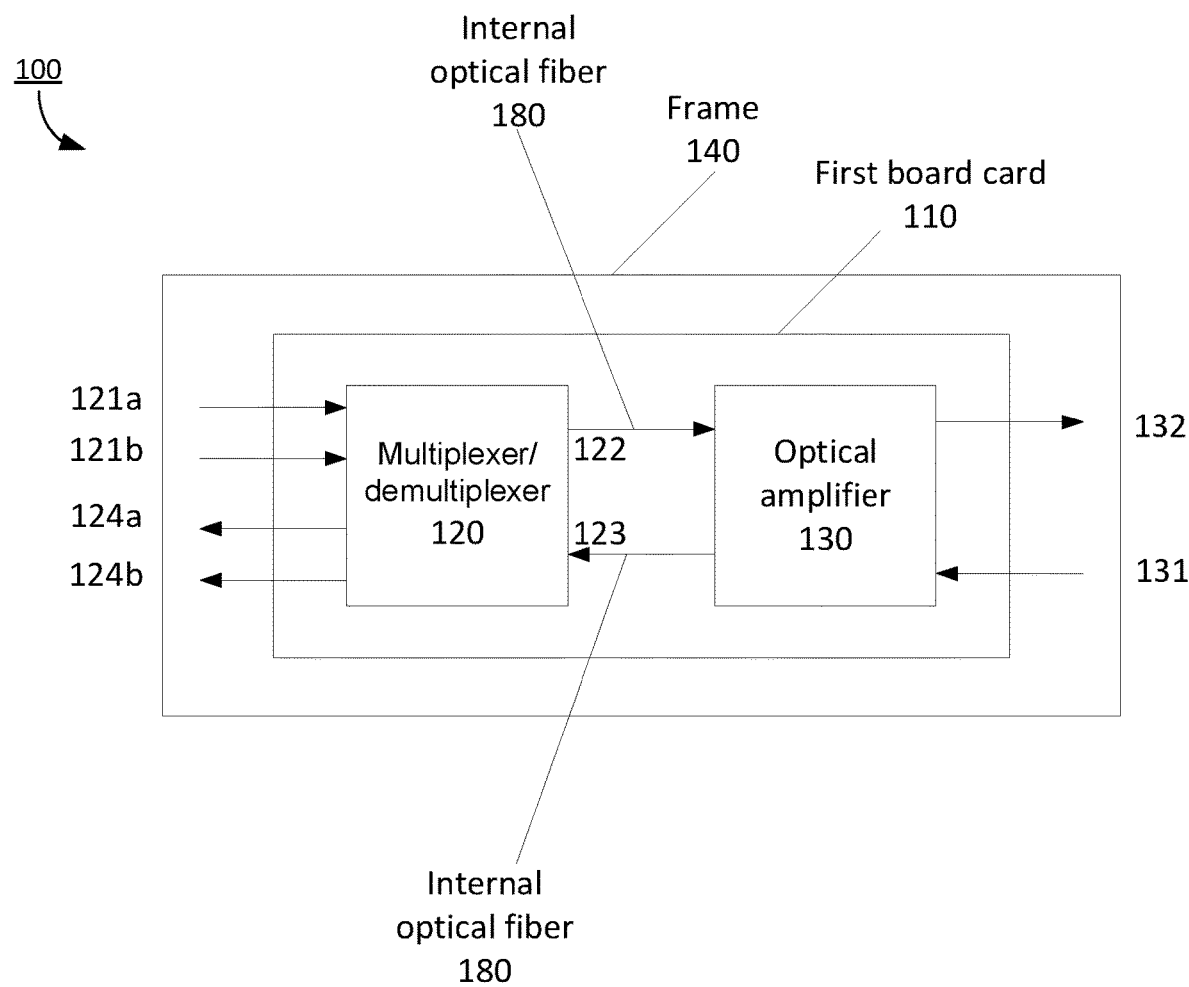
FIG. 1 is a structural block diagram of an exemplary optical transmission system, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

With the rapid development of technologies, requirements for bandwidth in a network also increases rapidly. Data interconnection between data centers is usually realized by using an optical transmission technology. The optical transmission technology may include two parts: an optical layer and an electrical layer. The optical layer includes a multiplexer/demultiplexer, an optical amplifier, and the like. The electrical layer includes a gray light unit on a terminal side and a color light unit on a line side.

Data transmission between a plurality of terminals in a data center may be performed through the electrical layer. A photoelectric conversion device is arranged in the data center to realize conversion between electrical signals and optical signals.

The photoelectric conversion device may be connected to terminals in the data center, respectively. Transmission of electrical signals and the like may be performed between the photoelectric conversion device and the terminals.

In a case where long-distance data transmission is required between a plurality of terminals in one data center and a plurality of terminals in another data center, data transmission may be performed through an optical transmission system to achieve the purpose of large-capacity and long-distance transmission.

For electrical signals that are output by various terminals in a first data center through the electrical layer and need to be transmitted to the plurality of terminals in a second data center, the photoelectric conversion device may be used in the first data center to convert the electrical signals of the terminals respectively into split optical signals. The plurality of split optical signals are respectively transmitted to an optical transmission system in the first data center. The optical transmission system is then used for combining the plurality of split optical signals into one combined optical signal and outputting the one combined optical signal, for example, transmitting the one combined optical signal to an optical transmission system in the second data center.

In addition, for one combined optical signal transmitted by the plurality of terminals in the second data center to the first data center, the optical transmission system in the first data center may be configured to receive the one combined optical signal, and the optical transmission system in the first data center may be configured to convert the one combined optical signal into split optical signals for transmission to various terminals in the first data center, respectively. The split optical signals are then transmitted to the photoelectric conversion device in the first data center. The photoelectric conversion device in the first data center is configured to convert the split optical signals into electrical signals, and output the electrical signals obtained by conversion to corresponding terminals in the first data center, so that the terminals can obtain the electrical signals.

In the present disclosure, a terminal includes a device with a certain computing capability, for example, a smart phone, a notebook, a Personal Computer (PC) computer, and the like.

The terminal may include at least one processor. The quantity of processors depends on the configuration and type of the terminal. The terminal may also include a memory. The memory may include a volatile memory (e.g., a Random Access Memory (RAM)), or a non-volatile memory (e.g., a Read-Only Memory or a flash memory). The memory usually stores an operating system, one or more application programs, or program data, and the like.

The terminal further includes some basic configurations, such as a network card chip, an Input/Output (IO) bus, a camera, and audio and video components. In some embodiments, the terminal may further include some peripheral devices, such as a keyboard, a mouse, a stylus, or a printer.

A network may include a center network. Data transmission of the center network tends to be centralized. The quantity of transmission links is small, and the amount of bandwidth involved in each transmission link is large. Currently, many optical transmission technologies are applicable to a center network scenario. At least two optical transmission systems are involved in each transmission link in the center network scenario.

Each optical transmission system involved in the center network scenario has a hardware cost. Due to the small quantity of transmission links, the quantity of optical transmission systems involved in the center network scenario is small. In a case where the center network scenario carries a task of large-bandwidth data transmission, the total hardware cost of the optical transmission system involved in the center network scenario is often acceptable.

For example, the devices included in the optical transmission system exist independently. Each device has independent physical components, such as a frame, a fan, a power supply, and a board card. Therefore, each device has its own physical components and the like.

For example, each device is arranged in a board card in its own frame, and each frame has devices such as a fan and a power supply.

In some embodiments, the optical transmission system includes a multiplexer/demultiplexer, an optical amplifier, and the like. The multiplexer/demultiplexer and the optical amplifier may be located in different frames. For example, the multiplexer/demultiplexer is located in a first frame, and the multiplexer/demultiplexer is arranged on a board card in the first frame. The optical amplifier is located in a second frame, and the optical amplifier is arranged on a board card in the second frame.

Therefore, the devices in an optical transmission system require the same quantity of physical components and board cards. The large quantity of physical components and board cards results in a high hardware cost.

However, the quantity of optical transmission systems involved in the center network scenario is small. In a case where the center network scenario carries a task of large-bandwidth data transmission, the total hardware cost of the optical transmission system involved in the center network scenario is often acceptable.

Since the devices in the optical transmission system are independent and located in various different frames, if communication between the various devices of the optical transmission systems is required, communication can be generally implemented only through the optical fibers (such as external fiber jumpers) between the board cards. The communication through optical fibers (such as external fiber jumpers) between the board cards has low stability and low reliability. For example, it may easily occur that a normal communication is affected by the external force and dirt on the optical fibers between board cards.

With the development of technology, the network is extending from the center to the edge. At a transmission level, there is a big difference between the edge network and the center network. For example, in the edge network scenario, the quantity of transmission links is increased significantly, and the amount of bandwidth involved in each transmission line is reduced significantly.

Since each transmission link involves at least two optical transmission systems, the quantity of optical transmission systems involved in the edge network scenario is increased significantly. Due to the hardware cost of each optical transmission system, in the edge network scenario, the total hardware cost of the optical transmission system involved is increased significantly, resulting in an unacceptable total hardware cost of the optical transmission system in the edge network scenario.

Therefore, there is a need to reduce the total hardware cost of an optical transmission system in the edge network scenario, and a need to improve the communication stability and reliability between devices in the optical transmission system.

In order to reduce the total hardware cost of the optical transmission system in the edge network scenario, and to improve the communication stability and reliability between devices in the optical transmission system, in some embodiments, for any optical transmission system, in a case where the optical transmission system includes at least two devices, the at least two devices included in the optical transmission system may share the same set of physical components. For example, the at least two devices included in the optical transmission system are arranged in a same frame. In the frame, the at least two devices included in the optical transmission system are arranged on a same board card. Only one power supply and one fan may be installed in one frame, thereby reducing the quantity of physical components and the quantity of board cards in the optical transmission system. As a result, the total hardware cost of the optical transmission system in the edge network scenario can be reduced.

Since the at least two devices included in the optical transmission system are arranged on the same board card, when the devices in the optical transmission system requires communication, the communication may be performed based on optical fibers (such as internal fiber connection) inside the board card, which can avoid the situation where the normal communication is affected by the external force and dirt on the optical fibers between board cards, and can improve the stability and reliability of the communication between the at least two devices included in the optical transmission system.

FIG. 1 shows a structural block diagram of an exemplary optical transmission system 100, according some embodiments of the present disclosure. Referring to FIG. 1, the optical transmission system 100 includes a first board card 110, a multiplexer/demultiplexer 120, and an optical amplifier 130.

Both the multiplexer/demultiplexer 120 and the optical amplifier 130 are arranged on the first board card 110.

In a multiplexing scenario, the multiplexer/demultiplexer 120 is configured to receive a plurality of split optical signals and combine the received plurality of split optical signals into one combined optical signal. The optical amplifier 130 is configured to amplify power of the one combined optical signal obtained by combining, and output the power-amplified combined optical signal through a combined optical signal output port 132. In order to compensate for the power loss of the optical signal caused by the multiplexer/demultiplexer 120, that is, to compensate for the increased overall insertion loss, the optical amplifier 130 may be connected after the multiplexer/demultiplexer 120 to compensate the power of the signal without causing obvious performance declination, that is, an output of the multiplexer/demultiplexer 120 is used as an input of the optical amplifier 130.

In a demultiplexing scenario, the optical amplifier 130 is configured to receive one combined optical signal sent externally (for example, sent from the outside of the data center to the optical transmission system 100 of the data center) from a combined optical signal input port 131, and amplify power of the one combined optical signal sent externally. The multiplexer/demultiplexer 120 is further configured to split the power-amplified one combined optical signal sent externally into a plurality of split optical signals. In order to compensate for the loss of the optical signal caused by the multiplexer/demultiplexer 120, that is, to compensate for the increased overall insertion loss, the optical amplifier 130 may be connected before the multiplexer/demultiplexer 120 to gain the power of the signal without causing obvious performance declination, that is, an output of the optical amplifier 130 is used as an input of the multiplexer/demultiplexer 120.

In the multiplexing scenario, the multiplexer/demultiplexer 120 may be configured to receive the plurality of split optical signals that are sent by the photoelectric conversion device and need to be transmitted to the outside, combine the plurality of split optical signals into one combined optical signal, and then output the one combined optical signal to the optical amplifier 130. The optical amplifier 130 may be configured to amplify the power of the one combined optical signal obtained by combining, obtain a power-amplified combined optical signal, so as to realize power compensation for the combined optical signal, and then output the power-amplified combined optical signal, for example, transmit the power-amplified combined optical signal to the outside by optical fibers. Frequency bands of the various split optical signals may be different.

In some embodiments, the multiplexer/demultiplexer 120 includes a multiplexing node and a demultiplexing node.

The multiplexing node includes a plurality of split optical signal input ports (e.g., 121a, 121b) and one combined optical signal output port (e.g., 122). The split optical signal input ports (e.g., 121a, 121b) are configured to receive the split optical signals of different frequency bands. The one combined optical signal output port (e.g., 122) is configured to output one combined optical signal.

For example, the multiplexing node receives one split optical signal through one split optical signal input port of the plurality of split optical signal input ports (e.g., 121a, 121b), respectively, to obtain a plurality of split optical signals. Then the multiplexing node combines the plurality of split optical signals into one combined optical signal, and outputs the one combined optical signal to the optical amplifier 130 and the like through the one combined optical signal output port (e.g., 122).

In the demultiplexing scenario, the optical amplifier 130 may be configured to receive one combined optical signal transmitted externally (which is obtained by combining a plurality of split optical signals before being transmitted to the optical amplifier 130), amplify the power of the received one combined optical signal to obtain a power-amplified combined optical signal to realize the power compensation of the combined optical signal, and then transmit the power-amplified combined optical signal to the multiplexer/demultiplexer 120. The multiplexer/demultiplexer 120 may be configured to, after receiving the power-amplified combined optical signal, split the power-amplified combined optical signal into a plurality of split optical signals, transmit the plurality of split optical signals to the photoelectric conversion device, so that the photoelectric conversion device may convert the split optical signals into electrical signals respectively, and send the electrical signals and the like to the corresponding terminals. Frequency bands of the various split optical signals may be different.

The demultiplexing node includes one combined optical signal input port (e.g., 123) and a plurality of split optical signal output ports (e.g., 124a, 124b). The split optical signal output ports (e.g., 124a, 124b) are configured to output split optical signals of different frequency bands. The one combined optical signal input port (e.g., 123) is configured to receive one combined optical signal from the optical amplifier 130.

For example, the demultiplexing node may receive the power-amplified combined optical signal through the one combined optical signal input port (e.g., 123), split the power-amplified combined optical signal into a plurality of split optical signals, and output one split optical signal through the split optical signal output ports (e.g., 124a, 124b), respectively. Different split optical signal output ports (e.g., 124a, 124b) output the split optical signals of different frequency bands.

In the present disclosure, two or more devices (such as a multiplexer/demultiplexer 120 and an optical amplifier 130) included in the optical transmission system 100 may be arranged on the same board card 110. Therefore, the two or more devices (such as a multiplexer/demultiplexer 120 and an optical amplifier 130) included in the optical transmission system 100 may be arranged in the same frame 140, so that the two or more devices (such as a multiplexer/demultiplexer 120 and an optical amplifier 130) included in the optical transmission system 100 can share the same set of physical components (such as a frame, a fan, and a power supply), thereby reducing the number of physical components and the number of boards in the optical transmission system 100, and further reducing the total hardware cost of the optical transmission system 100 in an edge network scenario.

In some embodiments, in a case where the optical transmission system 100 further includes other devices, these devices, the multiplexer/demultiplexer 120, and the optical amplifier 130, may share the same set of physical components. For example, these devices, the multiplexer/demultiplexer 120, and the optical amplifier 130 may be arranged on the same board card 110. Therefore, these devices, the multiplexer/demultiplexer 120, and the optical amplifier 130 can be arranged in the same frame 140, so that these devices, the multiplexer/demultiplexer 120, and the optical amplifier 130 can share the same set of physical components (such as a frame, a fan, and a power supply), thereby further reducing the number of physical components and the number of board cards in the optical transmission system 100, and further reducing the total hardware cost of the optical transmission system 100 in an edge network scenario. In this way, the quantity of hardware of the optical transmission system 100 in the edge network scenario may be further reduced, and the total hardware cost of the optical transmission system 100 in the edge network scenario may be further reduced relatively.

Since a plurality of devices in the optical transmission system may be integrated on one board card, the utilization rate of the board card can be improved. For example, the space utilization of the board card can be improved.

Since the devices in the optical transmission system 100 arranged on the first board card 110 may communicate based on internal optical fibers 180 (such as internal fiber connection) inside the first board card 110. Compared with the communication based on optical fibers between the board cards, the communication based on internal optical fibers inside a board card can avoid the situation where the normal communication is affected by the external force and dirt on the optical fibers between board cards, which can improve the stability and reliability of the communication between at least two devices included in the optical transmission system 100.

Figure 2:
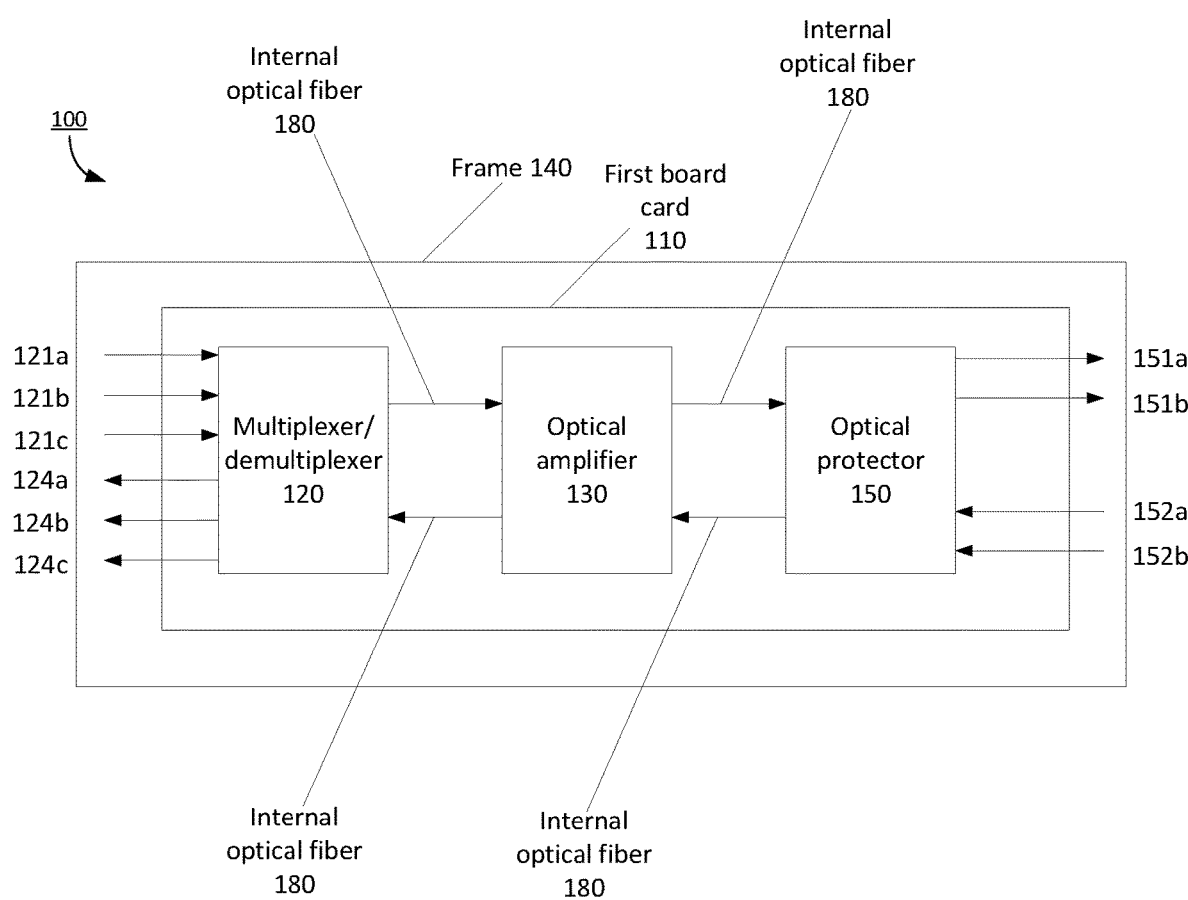
FIG. 2 is a structural block diagram of another exemplary optical transmission system, according to some embodiments of the present disclosure.

FIG. 2 is a structural block diagram of another exemplary optical transmission system 100, according to some embodiments of the present disclosure. Referring to FIG. 2, in some embodiments, the optical transmission system 100 further includes an optical protector 150. The optical protector 150 is arranged on the first board card 110.

In a multiplexing scenario, the optical protector 150 is configured to shunt the power-amplified one combined optical signal obtained by combining into at least two identical combined optical signals, and one-to-one correspondingly output each shunted combined optical signal, through at least two output ports (e.g., 151a, 151b) of the optical protector 150.

The power-amplified one combined optical signal obtained by combining may be shunted, by using a shunt (such as a splitter), into at least two identical combined optical signals.

In this way, outputting of two or more identical combined optical signals is implemented, wherein some of the combined optical signals is used as an alternative combined optical signal.

When one of the combined optical signals is unexpectedly interrupted or cannot reach a destination, the other combined optical signal(s) may continue to be transmitted. In this way, the optical transmission system 100 not only completes the combination of the split optical signals, but also realizes the function of double-transmitting the combined optical signal, and realizes protection, such as Optical Transmission Section Protection (OTSP), for the combined optical signal.

In the demultiplexing scenario, the optical protector 150 is configured to receive, through at least two input ports (e.g., 152a, 152b) of the optical protector 150, at least one combined optical signal sent externally, and input one combined optical signal to the optical amplifier 130.

In this way, receiving of two or more identical combined optical signals is supported (or switching to receive different combined optical signals among the two or more identical combined optical signals is supported), wherein some of the combined optical signals is used as an alternative combined optical signal.

When one combined optical signal is unexpectedly interrupted or cannot reach the optical transmission system, another combined optical signal can be received. In this way, the optical transmission system 100 not only completes splitting of the combined optical signal, but also realizes the function of double-receiving the combined optical signal, and realizes protection, such as OTSP, for the combined optical signal.

An optical switch may be used for receiving two or more identical combined optical signals (or supporting switching to receive different combined optical signals among the two or more identical combined optical signals).

In some embodiments of the present disclosure, various devices in the optical transmission system may be arranged on a same board card, for example, the multiplexer/demultiplexer and the optical amplifier (and also the optical protector) are arranged on a same board card. Because the size of the board card is often limited, the use space for each device on the board card is often limited.

For example, for the multiplexer/demultiplexer, since other devices (such as the optical amplifier and the optical protector) occupy a part of the space in the board card, only part of the space in the board card can be provided for the multiplexer/demultiplexer to use.

The multiplexer/demultiplexer often include a multiplexing node and a demultiplexing node. The multiplexing node includes two or more split optical signal input ports and one combined optical signal output port, and the demultiplexing node includes two or more split optical signal output ports and one combined optical signal input port. Each port needs to be provided with a corresponding element, and each element needs to occupy a part of the space on the board card. Therefore, each port needs to occupy a part of the space on the board card.

Only part of the space in the board is provided for the multiplexer/demultiplexer to use, therefore, the quantity of ports included in the multiplexer/demultiplexer is limited. One split optical signal output port corresponds to one frequency band, and one split optical signal input port corresponds to one frequency band. Therefore, since the quantity of ports included in the multiplexer/demultiplexer is limited, a frequency band range supported by the multiplexer/demultiplexer is limited, and thus a frequency band range supported by the optical transmission system is limited.

For example, in an edge network scenario, if the amount of data that needs to be transmitted suddenly increases due to some requirements, since the frequency band range supported by the optical transmission system is limited, the transmission speed of the optical transmission system is likely to be unable to meet the actual requirements. It is impossible to quickly transmit a large amount of data that needs to be transmitted, resulting in a low transmission efficiency in scenarios where the amount of data surges in edge scenarios.

Therefore, in order to improve the transmission efficiency in the scenarios where the amount of data surges in the edge scenarios, in some embodiments of the present disclosure, a multiplexing/demultiplexing expander may be expanded in optical transmission, so as to use the multiplexing/demultiplexing expander to expand more split optical signal output ports and split optical signal input ports for the optical transmission system. One split optical signal output port corresponds to one frequency band, and one split optical signal input port corresponds to one frequency band. This is equivalent to increasing the quantity of ports available in the multiplexer/demultiplexer, thereby expanding the frequency band range supported by the multiplexer/demultiplexer, and further expanding the frequency band range supported by the optical transmission system. Therefore, in the edge network scenario, if the amount of data to be transmitted suddenly increases due to some requirements, the transmission speed of the optical transmission system can meet the actual requirements, and the large amount of data that needs to be transmitted can be quickly transmitted, which improves the transmission efficiency in the scenarios where the amount of data surges in the edge scenarios.

Figure 3:
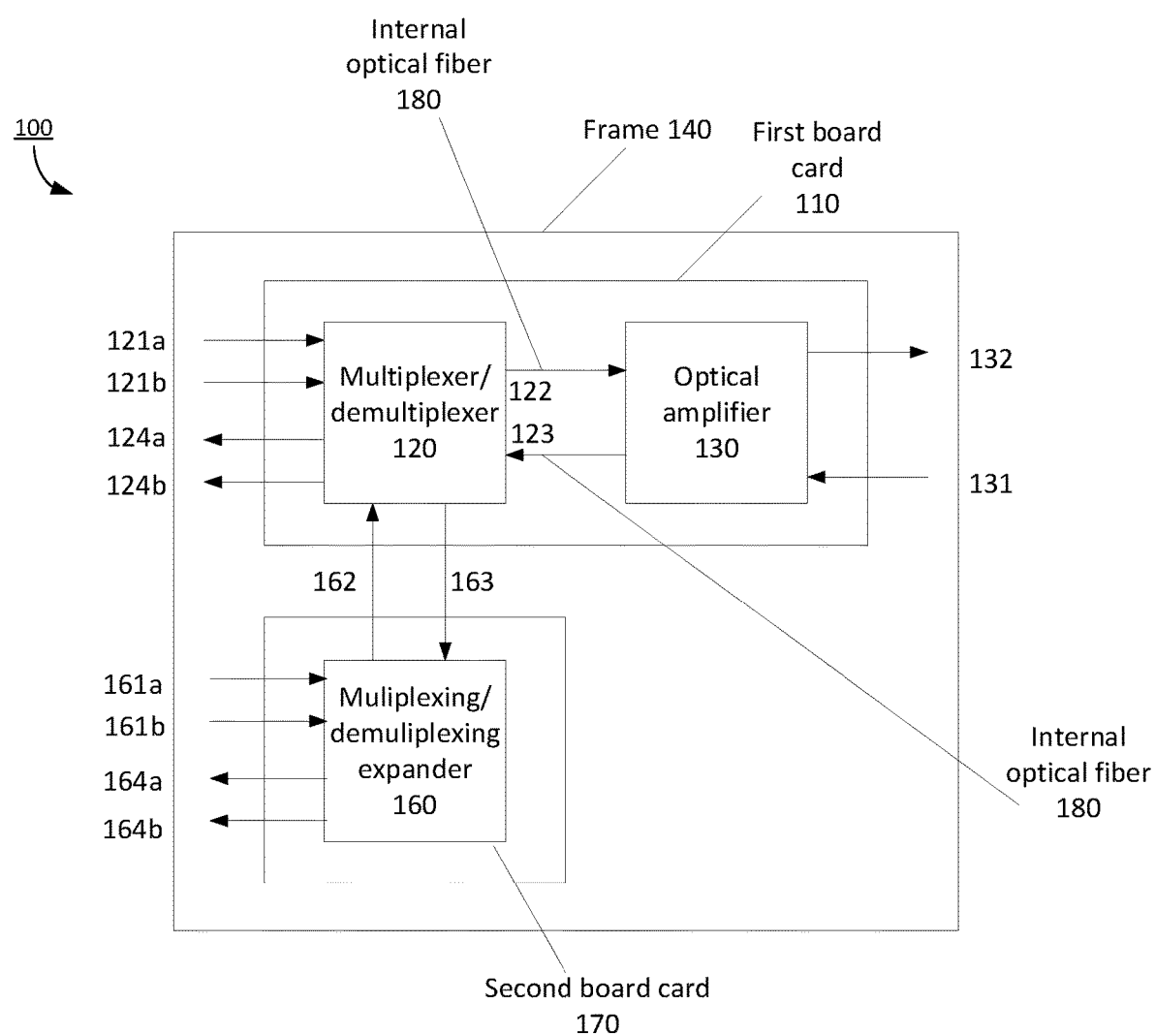
FIG. 3 is a structural block diagram of yet another exemplary optical transmission system, according to some embodiments of the present disclosure.

FIG. 3 is a structural block diagram of yet another exemplary optical transmission system 100, according some embodiments of the present disclosure. Referring to FIG. 3, in some embodiments of the present disclosure, the optical transmission system 100 further includes a multiplexing/demultiplexing expander 160 and a second board card 170. The multiplexing/demultiplexing expander 160 is arranged on the second board card 170. The first board card 110 and the second board card 170 are located in the same frame 140.

The multiplexing/demultiplexing expander 160 is configured to receive at least one split and expanded optical signal, process the at least one split and expanded optical signal into one combined and expanded optical signal, and input the combined and expanded optical signal into the multiplexer/demultiplexer 120. The multiplexer/demultiplexer 120 is further configured to combine the combined and expanded optical signal and the plurality of split optical signals into one combined optical signal.

In the multiplexing scenario, the multiplexer/demultiplexer 120 may receive the plurality of split optical signals that are sent by the photoelectric conversion device and need to be transmitted to the outside. The multiplexing/demultiplexing expander 160 may receive at least one split and expanded optical signal that is sent by the photoelectric conversion device and needs to be transmitted to the outside, and process the at least one split and expanded optical signal into one combined and expanded optical signal. For example, in a case where the multiplexing/demultiplexing expander 160 receives one split and expanded optical signal, the one split and expanded optical signal may be directly used as one combined and expanded optical signal. Alternatively, in a case where the multiplexing/demultiplexing expander 160 receives at least two split and expanded optical signals, the at least two split and expanded optical signals may be combined into one combined and expanded optical signal, and the one combined and expanded optical signal is input to the multiplexer/demultiplexer 120. The multiplexer/demultiplexer 120 combines the combined and expanded optical signal and the plurality of split optical signals into one combined optical signal, and then output the one combined optical signal to the optical amplifier 130. The optical amplifier 130 may amplify the power of the one combined optical signal obtained by combining, obtain a power-amplified combined optical signal, so as to realize power compensation for the combined optical signal, and then output the power-amplified combined optical signal, for example, transmit the power-amplified combined optical signal to the outside by optical fibers. Frequency bands of the various split optical signals may be different.

In some embodiments, the multiplexing/demultiplexing expander 160 includes a multiplexing expanding node and a demultiplexing expanding node.

The multiplexing expanding node includes at least one split and expanded optical signal input ports (e.g., 161a, 161b) and one combined and expanded optical signal output port (e.g., 162). The split and expanded optical signal input ports (e.g., 161a, 161b) are configured to receive the split and expanded optical signals of different frequency bands. The one combined and expanded optical signal output port (e.g., 162) is configured to output one combined and expanded optical signal obtained by combining.

For example, the multiplexing expanding node receives one split and expanded optical signal through a plurality of split and expanded optical signal input ports (e.g., 161a, 161b), respectively, to obtain a plurality of split and expanded optical signals, and then the multiplexing expanding node combines the plurality of split and expanded optical signals into one combined and expanded optical signal, and outputs the one combined optical signal to the multiplexer/demultiplexer 120 and the like through the one combined and expanded optical signal output port (e.g., 162).

In addition, the multiplexer/demultiplexer 120 is further configured to split the power-amplified one combined optical signal sent externally into a plurality of split optical signals and one combined and expanded optical signal. Then the multiplexer/demultiplexer 120 at least inputs the one combined and expanded optical signal into the multiplexing/demultiplexing expander 160. The multiplexing/demultiplexing expander 160 is further configured to process the combined and expanded optical signal into at least one split and expanded optical signal.

In the demultiplexing scenario, the optical amplifier 130 may receive one combined optical signal transmitted externally (which is obtained by combining a plurality of split optical signals and the combined and expanded optical signal before being transmitted to the optical transmission system 100) from a combined optical signal input port 133, and then amplify the power of the received one combined optical signal to obtain a power-amplified combined optical signal to realize the power compensation of the combined optical signal. Then the optical amplifier 130 transmits the power-amplified combined optical signal to the multiplexer/demultiplexer 120. The multiplexer/demultiplexer 120, after receiving the power-amplified combined optical signal, may split the power-amplified combined optical signal into a plurality of split optical signals and one combined and expanded optical signal, and transmit the plurality of split optical signals to the photoelectric conversion device. The photoelectric conversion device may convert the split optical signals into electrical signals respectively, and send the electrical signals and the like to the corresponding terminals. Frequency bands of the various split optical signals may be different.

Moreover, the multiplexer/demultiplexer 120 may transmit the combined and expanded optical signal to the multiplexing/demultiplexing expander 160. After receiving the combined and expanded optical signal, the multiplexing/demultiplexing expander 160 may process the combined and expanded optical signal into at least one split and expanded optical signal. For example, the combined and expanded optical signal may be split into at least two split and expanded optical signals, and transmit the at least two split and expanded optical signals to the photoelectric conversion device. The photoelectric conversion device may convert the split and expanded optical signals into electrical signals, and send the electrical signals to the corresponding terminals. Frequency bands of various split and expanded optical signals may be different.

In some embodiments, the multiplexing/demultiplexing expander 160 includes a multiplexing expanding node and a demultiplexing expanding node.

The demultiplexing expanding node includes one combined and expanded optical signal input port (e.g., 163) and a plurality of split and expanded optical signal output ports (e.g., 164a, 164b). The split and expanded optical signal output ports (e.g., 164a, 164b) are configured to output split and expanded optical signals of different frequency bands. The one combined and expanded optical signal input port (e.g., 163) is configured to receive one combined and expanded optical signal from the multiplexer/demultiplexer 120.

For example, the demultiplexing expanding node may receive one combined and expanded optical signal through the one combined and expanded optical signal input port (e.g., 163), split the one combined and expanded optical signal into a plurality of split and expanded optical signals, and output the split and expanded optical signals through the split and expanded optical signal output ports (e.g., 164a, 164b), respectively. Different split and expanded optical signal output ports (e.g., 164a, 164b) output the split and expanded optical signals of different frequency bands.

In some embodiments of the present disclosure, the multiplexing/demultiplexing expander 160, the multiplexer/demultiplexer 120, and the optical amplifier 130 may be arranged in the same frame 140. Therefore, the multiplexing/demultiplexing expander 160, the multiplexer/demultiplexer 120, and the optical amplifier 130 can share the same set of physical components, such as a frame, a fan, and a power supply, thereby reducing the number of physical components and the number of board cards in the optical transmission system 100, and further reducing the total hardware cost of the optical transmission system 100 in an edge network scenario.

The frequency bands supported by the multiplexer/demultiplexer and the multiplexing/demultiplexing expander may be different, therefore, the frequency band compensation of the multiplexing/demultiplexing expander for the multiplexer/demultiplexer is realized, thereby improving the transmission efficiency.

In some embodiments, the optical transmission system 100 supports the transmission of optical signals in a frequency band (e.g., a C-band range). When the frequency band supported by the multiplexer/demultiplexer 120 is a lower frequency band in the frequency range, the frequency band supported by the multiplexing/demultiplexing expander 160 may be a higher frequency band in the frequency range. In some embodiments, when the frequency band supported by the multiplexer/demultiplexer 120 is a higher frequency band in the frequency range, the frequency band supported by the multiplexing/demultiplexing expander 160 may be a lower frequency band in the frequency range. In some embodiments, when the frequency band supported by the multiplexer/demultiplexer 120 is a frequency band in a center region of the frequency range, the frequency band supported by the multiplexing/demultiplexing expander 160 may be frequency bands at ends of the frequency range.

In addition, in some embodiment of the present disclosure, in a case where a multiplexing/demultiplexing expander 160 needs to be added to the optical transmission system, the hardware costs increases if the multiplexing/demultiplexing expander 160 and the second board card 170 are separately configured for the optical transmission system 100. Therefore, in order to reduce the hardware costs, if a second optical transmission system already exists in the data center, a multiplexer/demultiplexer in the second optical transmission system may be temporarily used as the multiplexing/demultiplexing expander 160 in the optical transmission system 100.

As discussed above, a network may include a center network. Data transmission of the center network tends to be centralized, the quantity of transmission links is small, and the amount of bandwidth involved in each transmission link is large. That is, the amount of data transmitted in the center network is large. In order to meet the transmission requirements of large bandwidth, the quantity of ports in the multiplexer/demultiplexer in the optical transmission system needs to be sufficient. For example, a great many of split optical signal output ports and a great many of split optical signal input ports are required, one split optical signal output port corresponds to one frequency band, and one split optical signal input port corresponds to one frequency band; otherwise, a large amount of data transmission in the center network scenario cannot be completed efficiently.

With the development of technology, the network is extending from the center to the edge. At a transmission level, there is a big difference between the edge network and the center network. For example, in the edge network scenario, the quantity of transmission links is increased significantly, and the amount of bandwidth involved in each transmission line is reduced significantly. That is, the amount of bandwidth in the edge network is much smaller than the amount of bandwidth in the center network.

Since the amount of bandwidth in the edge network is much smaller than the amount of bandwidth in the center network, a small quantity of split optical signal output ports and split optical signal input ports in the multiplexer/demultiplexer in the optical transmission system can meet high-efficient transmission of a large amount of data in the edge network scenario without the need for a sufficient quantity of split optical signal output ports and split optical signal input ports in the multiplexer/demultiplexer in the optical transmission system. Otherwise, it may cause a waste of bandwidth resources. For example, some split optical signal output ports and split optical signal input ports have not been used, but these split optical signal output ports and split optical signal input ports are adapted to a frequency band, resulting in the frequency band being unused and the frequency band being wasted.

Therefore, a requirement of saving bandwidth resources is proposed.

In order to save bandwidth resources, when the amount of bandwidth in the edge network is much smaller than the amount of bandwidth in the center network, the multiplexer/demultiplexer in the optical transmission system adapted for the edge network may include a small quantity of split optical signal output ports and split optical signal input ports, for example, less than the quantity of split optical signal output ports and split optical signal input ports included in the multiplexer/demultiplexer in the optical transmission system adapted for the center network.

In some embodiments, the multiplexer/demultiplexer may include filters. One filter corresponds to one split optical signal output port or one split optical signal input port. Therefore, in order that the multiplexer/demultiplexer in the optical transmission system adapted for the edge network may include a small quantity of split optical signal output ports or split optical signal input ports, the multiplexer/demultiplexer in the present disclosure may include a small quantity of filters, and the quantity of filters may be smaller than the quantity of the filters included in the optical transmission system adapted for the center network and the like.

In some embodiments, there are a plurality of devices in the optical transmission system arranged on a same board card. Therefore, since the devices other than the multiplexer/demultiplexer may occupy a part of the space of the board card, the free space in the board is available for arranging the multiplexer/demultiplexer, for example, arranging the filter. In this way, the multiplexer/demultiplexer may be arranged in the remaining space in the board card.

In some embodiments, the filter may include a Thin Film Filter (TFF) and the like.

A first filter may include a TFF and the like. The first filter includes a first input port, a second input port, and an output port. The first input port of the first filter may include a transmissive port. The second input port may include a reflective port. The output port may include a common port, and the like.

A second filter may include a TFF and the like. The second filter includes a first output port, a second output port, and an input port. The first output port of the second filter may include a transmissive port. The second output port may include a reflective port. The input port may include a common port, and the like.

In some embodiments of the present disclosure, the multiplexer/demultiplexer includes a multiplexing node and a demultiplexing node.

The multiplexing node includes a plurality of first filters. Each of the first filters is configured to receive a split optical signal of a different frequency band, and the plurality of first filters are configured to combine the split optical signals of different frequency bands into one combined optical signal. The plurality of first filters may be connected in series or in parallel. In this way, the joint operation of the plurality of first filters may combine the split optical signals of different frequency bands into one combined optical signal.

The demultiplexing node includes a plurality of second filters, the second filters are configured to split one combined optical signal into a plurality of split optical signals of different frequency bands. Each of the second filters is configured to output one split optical signal of a different frequency band. The plurality of second filters may be connected in series or in parallel. In this way, the joint operation of the plurality of second filters may be used for splitting one combined optical signal into a plurality of split optical signals of different frequency bands.

Figure 4:
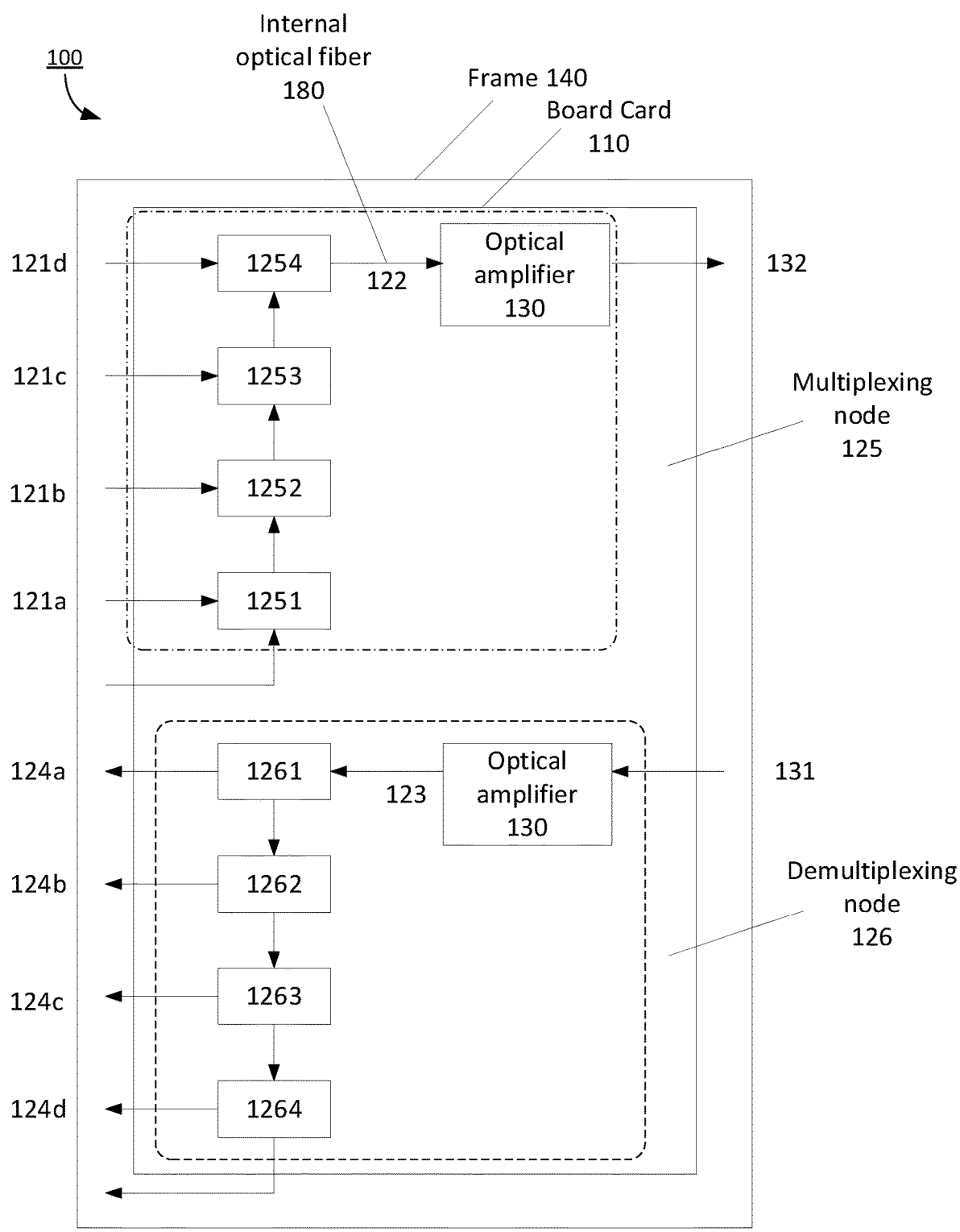
FIG. 4 is a structural block diagram of yet another exemplary optical transmission system, according to some embodiments of the present disclosure.
Figure 5:
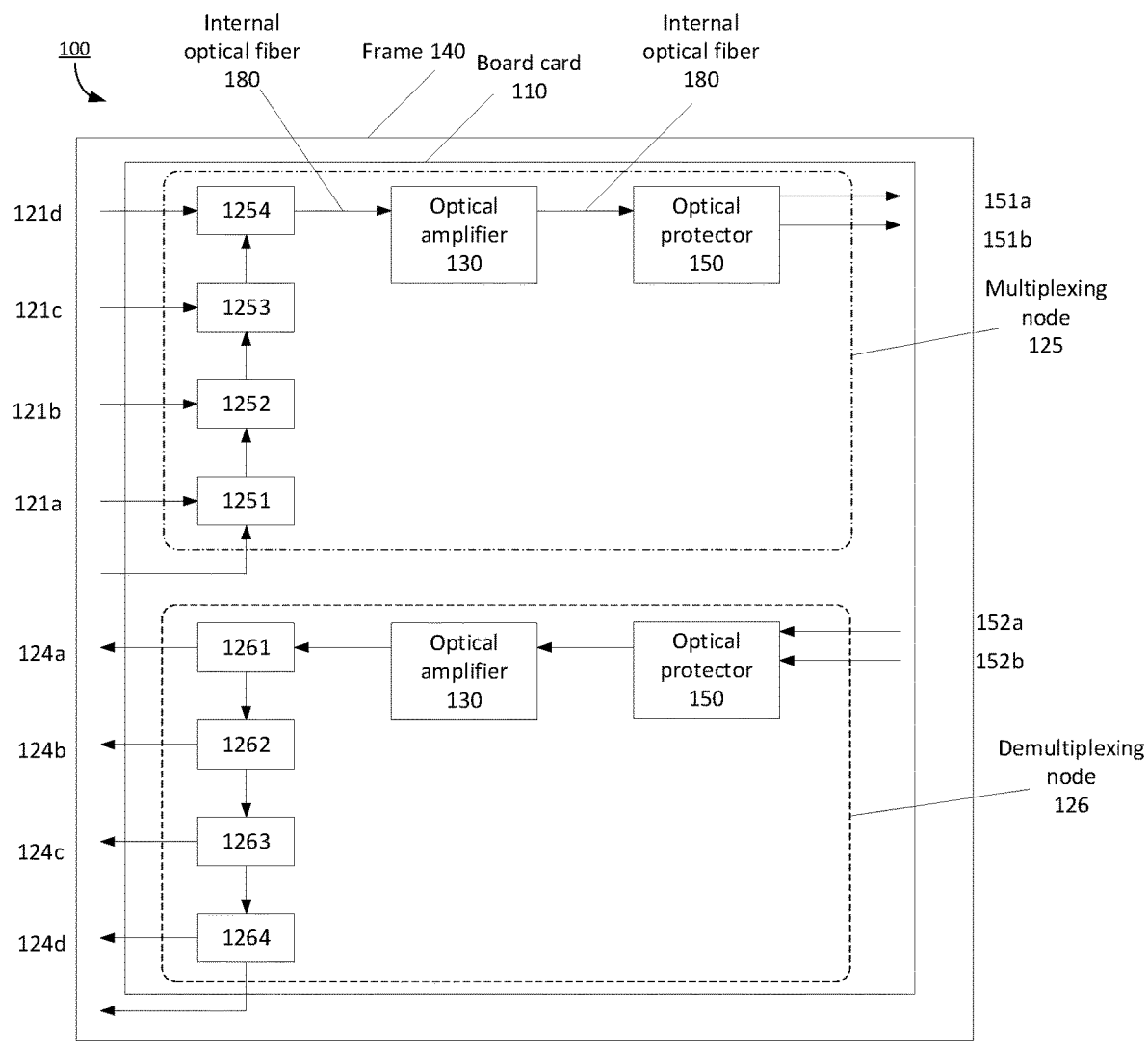
FIG. 5 is a structural block diagram of yet another exemplary optical transmission system, according to some embodiments of the present disclosure.

FIG. 4 is a structural block diagrams of an exemplary optical transmission systems 200, according some embodiments of the present disclosure. FIG. 5 is a structural block diagrams of another exemplary optical transmission systems 200, according some embodiments of the present disclosure. Referring to FIG. 4 and FIG. 5, a multiplexer/demultiplexer includes a multiplexing node 125 and a demultiplexing node 126. The multiplexing node 125 includes a plurality of first filters (e.g., 1251~1254), and the demultiplexing node 126 includes a plurality of second filters (e.g., 1261~1264).

Each of the first filters (e.g., 1251~1254) includes a first input port, a second input port, and an output port. The first input port of each of the first filters (e.g., 1251~1254) is configured to receive a split optical signal of a different frequency band. The plurality of first filters are connected in series. In two adjacent first filters (e.g., 1251 and 1252) connected in series, the output port of the first filter 1251 at the front is connected to the second input port of the first filter 1252 at the rear, and the output port of the first filter 1254 ranked last is configured to output one multiplexed signal.

Each of the second filters (e.g., 1261~1264) includes a first output port, a second output port, and an input port. The plurality of second filters (e.g., 1261~1264) are connected in series. The input port of the second filter 1261 ranked first is configured to receive a multiplexed signal. In two adjacent second filters (e.g., 1261 and 1262) connected in series, the second output port of the second filter 1261 at the front is connected to the input port of the second filter at the rear. The first output port of each of second filters (e.g., 1261~1264) is configured to output the split optical signal of a different frequency band obtained by splitting.

Further, the multiplexing node 125 further includes at least one first expansion filter. Each first expansion filter is configured to receive a split and expanded optical signal. A frequency band of the split and expanded optical signal is different from a frequency band of the split optical signal received by the first input port of each of the first filters. The at least one first expansion filter is configured to process the received at least one split and expanded optical signal into one combined and expanded optical signal, and input the combined and expanded optical signal into the second input port of the first filter ranked first. The demultiplexing node 126 further includes at least one second expansion filter, the plurality of second filters are configured to split the received multiplexed signal into a plurality of split optical signals and one combined and expanded optical signal, and output, through the second output port of the second filter ranked last, the combined and expanded optical signal obtained by splitting to the at least one second expansion filter. The at least one second expansion filter is further configured to process the combined and expanded optical signal to obtain at least one split and expanded optical signal. Each second expansion filter is configured to one-to-one correspondingly output one split and expanded optical signal. A frequency band of the split and expanded optical signal is different from the frequency band of the split optical signal output by the first output port of each of the first filters.

In the present disclosure, in a scenario of combining split optical signals, due to the Stimulated Raman Scattering (SRS) effect, in the process of transmitting the combined optical signal in the optical fiber, the power of the optical signal in the high frequency band will be attenuated, while the power of the optical signal in the low frequency band will be increased, that is, the power of the optical signal will migrate from the high frequency band to the low frequency band.

In addition, in the present disclosure, for a plurality of first filters connected in series, a larger quantity of first filters that need to be passed through by a split optical signal after being received by a first filter at the front through its own first input port results in a greater insertion loss of the split optical signal, that is, a more serious attenuation of the signal power. A smaller quantity of first filters that need to be passed through by a split optical signal after being received by a first filter at the rear through its own first input port results in a smaller insertion loss of the split optical signal, that is, a less serious attenuation of the signal power. The frequency bands of the split optical signals received by different first input ports are different.

From the perspective of frequency band, if the order of the first filter corresponding to the high frequency band is higher in the plurality of first filters connected in series in the multiplexing node, the split optical signal of the high frequency band has a larger insertion loss in the multiplexing node, and the signal power attenuation is larger. As can be seen, the signal power of the high-frequency split optical signal is double attenuated, which eventually leads to a very serious signal power attenuation of the high-frequency split optical signal. Therefore, the overall performance of the optical transmission system is reduced.

In order to avoid this situation, in some embodiments of the present disclosure, in two adjacent first filters connected in series, a frequency band of the split optical signal received by the first input port of the first filter at the front is smaller than a frequency band of the split optical signal received by the first input port of the first filter at the rear.

In this way, the frequency band of the split optical signal received by the first filter at the rear through its first input port is higher, and the quantity of first filters that need to be passed through is smaller, which reduces the attenuation degree of the signal power of the high frequency band as a whole, and improves the overall performance of the optical transmission system.

For a plurality of second filters connected in series, a smaller quantity of second filters that need to be passed through by a split optical signal before being output by a second filter at the front through its own first output port results in a smaller insertion loss of the split optical signal, that is, a less serious attenuation of the signal power. A larger quantity of second filters that need to be passed through by a split optical signal before being output by a second filter at the rear through its own first output port results in a larger insertion loss of the split optical signal, that is, a more serious attenuation of the signal power.

The frequency bands of the split optical signals output by different first output ports are different.

In addition, among the first input ports of the first filters (e.g., 1251~1254) in the multiplexing node 125 and the first output ports of the second filters (e.g., 1261~1264) in the demultiplexing node 126, one first input port uniquely corresponds to one first output port. For example, the frequency band used by one first input port for receiving the split optical signal is the same as the frequency band used by the only one first output port for outputting the split optical signal.

From the perspective of frequency band, for any frequency band, if the order of the first filter corresponding to the frequency band is higher in the plurality of first filters connected in series in the multiplexing node, and the order of the second filter corresponding to the frequency band is lower in the plurality of filters connected in series in the demultiplexing node, the split optical signal of the frequency band has a larger insertion loss in the multiplexing node, and the signal power attenuation is larger. Since the split optical signal of the frequency band has a larger insertion loss in the demultiplexing node, and the signal power attenuation is larger, the insertion loss is double increased, and the signal power is double attenuated. Ultimately, the insertion loss of the split optical signal in the frequency band is very large, that is, the attenuation of the signal power is very serious.

At the same time, there must be some frequency bands that if the order of the first filter corresponding to the frequency band is lower in the plurality of first filters (e.g., 1251~1254) connected in series in the multiplexing node 125 and the order of the second filter corresponding to the frequency band is higher in the plurality of second filters (e.g., 1261~1264) connected in series in the demultiplexing node 126, the split optical signal of the frequency band has a smaller insertion loss in the multiplexing node 125 with a smaller signal power attenuation, and the split optical signal of the frequency band has a smaller insertion loss in the demultiplexing node 126 with a smaller signal power attenuation. Finally, the insertion loss of the split optical signal in the frequency band is small, that is, the signal power attenuation is small.

As a result, the degrees of insertion loss of the split optical signals in different frequency bands are quite different, that is, the attenuation degrees of the signal power of the split optical signals in different frequency bands are quite different, which affects the overall performance of the optical transmission system in the demultiplexing and multiplexing scenarios.

In order to avoid this situation, in some embodiments of the present disclosure, in two adjacent first filters connected in series, in a case where the frequency band of the split optical signal received by the first input port of the first filter at the front is smaller than the frequency band of the split optical signal received by the first input port of the first filter at the rear, in two adjacent second filters connected in series, a frequency band of the split optical signal output by the first output port of the second filter at the front is smaller than a frequency band of the split optical signal output by the first output port of the second filter at the rear.

In two adjacent first filters connected in series, in a case where the frequency band of the split optical signal received by the first input port of the first filter at the front is larger than the frequency band of the split optical signal received by the first input port of the first filter at the rear, in two adjacent second filters connected in series, a frequency band of the split optical signal output by the first output port of the second filter at the front is larger than a frequency band of the split optical signal output by the first output port of the second filter at the rear.

In some embodiments of the present disclosure, the ports of the multiplexer/demultiplexer may correspond to a relatively large frequency band. For example, the frequency band range corresponding to each port of multiplexer/demultiplexer includes 100 Ghz or greater, so that the multiplexer/demultiplexer of the present disclosure supports access to single-wave high-baud rate data, multi-carrier superchannel data. Therefore, the optical transmission system of the present disclosure can support more types of data, so as to improve applicable scenarios and universality of the optical transmission system of the present disclosure.

In some embodiments, the optical amplifier 130 may include an Erbium Doped Fiber Application Amplifier (EDFA) and a Gain Flattening Filter (GFF), and the like.

Figure 6:
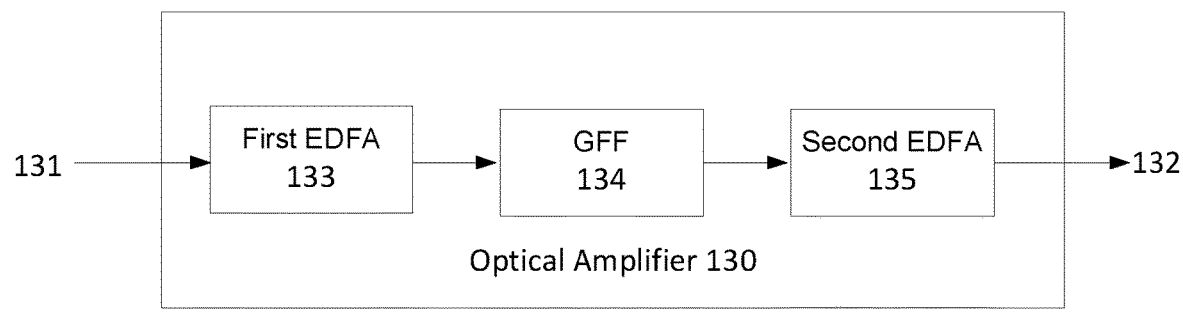
FIG. 6 is a structural block diagram of an exemplary optical amplifier, according to some embodiments of the present disclosure.

For example, in some embodiments, the multiplexing node 125 and the demultiplexing node 126 each include an optical amplifier 130, the optical amplifier 130 in the multiplexing node includes two EDFAs and one GFF. FIG. 6 is a structural block diagram of an exemplary optical amplifier 130, according to some embodiments of the present disclosure. Referring to FIG. 6, an input end of the first EDFA 133 is an input end 131 of the optical amplifier 130, an output end of the first EDFA 133 is connected to an input end of the GFF 134, an output end of the GFF 134 is connected to an input end of the second EDFA 135, and an output end of the second EDFA 135 is an output end 132 of the optical amplifier 130.

The same configuration is for the optical amplifier 130 in the demultiplexing node 126.

In some embodiments, if the optical amplifier and the multiplexer/demultiplexer are produced by different manufacturers, the optical amplifier and the multiplexer/demultiplexer are often located on different board cards, because the manufacturer of the optical amplifier cannot obtain attribute features of a filter in the multiplexer/demultiplexer, and the manufacturer of the multiplexer/demultiplexer cannot obtain attribute features of a filter and an amplifier in the optical amplifier. Therefore, the manufacturer of the optical amplifier cannot refer to the attribute features of the filter in the multiplexer/demultiplexer when designing the optical amplifier. The manufacturer of the multiplexer/demultiplexer cannot refer to the attribute features of the optical amplifier when designing the multiplexer/demultiplexer. Therefore, the finally designed optical transmission system including the optical amplifier and the multiplexer/demultiplexer has unbalanced attenuation degrees for split optical signals in various frequency bands, which will degrade the performance of the optical transmission system.

In the present disclosure, both the optical amplifier and the multiplexer/demultiplexer may be arranged on the same board card. Therefore, the optical transmission system in the present disclosure may be a comprehensive design by a manufacturer. For example, the optical transmission system may be comprehensively designed for characteristics of an EDFA, a GFF, a TFF, and the like. For example, the flatness design is carried out for the attenuation of the split optical signals in various frequency bands, so that the attenuation degrees of the optical transmission system for the split optical signals in various frequency bands are balanced, and the Tilt linearity of the optical signals may be improved, thereby improving the performance of the optical transmission system.

For example, when an optical transmission system is designed, the signal attenuation degree of a plurality of TFFs, a gain spectrum shape of the EDFA, and a gain spectrum shape of the GFF may be comprehensively considered to design the optical transmission system.

For example, according to the gain spectrum shape of the GFF, the attenuation spectrum of the plurality of TFFs and the unevenness of the EDFA gain spectrum may be compensated, so that the optical transmission system has higher attenuation flatness or Tilt linearity for optical signals in various frequency bands.

In the present disclosure, both the first filter and the second filter may include a TFF.

Figure 7:
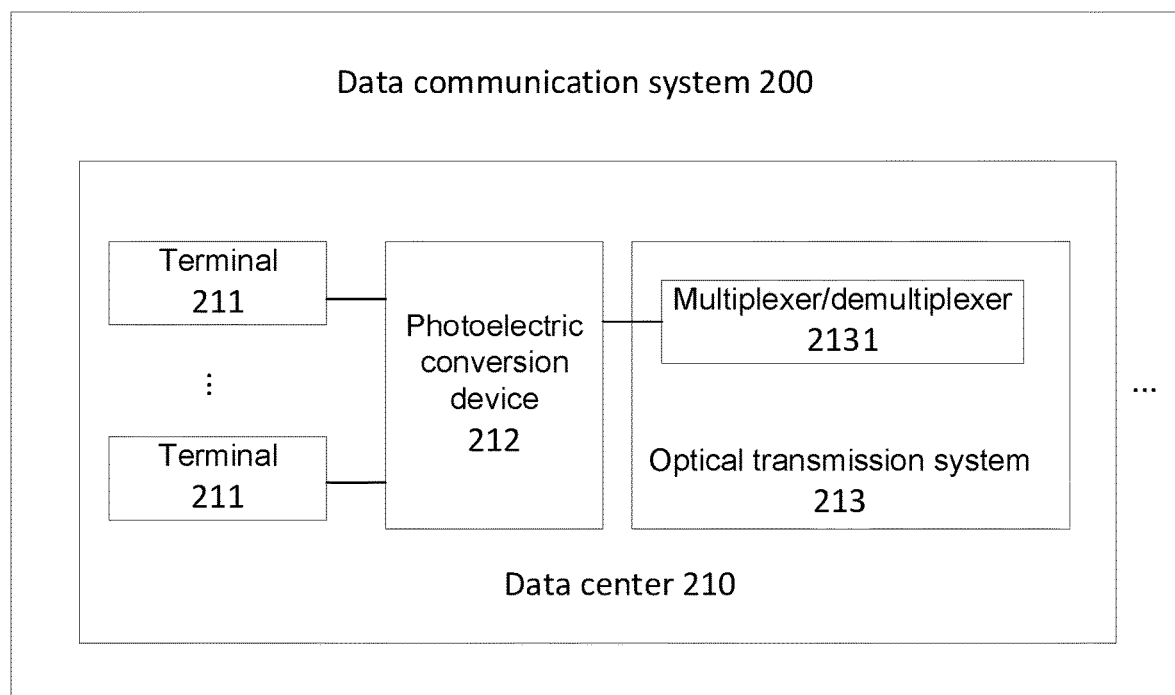
FIG. 7 is a structural block diagram of an exemplary data communication system, according to some embodiments of the present disclosure.

In addition, the present disclosure also provides a data communication system. FIG. 7 is a structural block diagram of an exemplary data communication system 200, according to some embodiments of the present disclosure. Referring to FIG. 7, the data communication system 200 includes at least one data center 210. The data center 210 includes at least one terminal 211, a photoelectric conversion device 212 communicatively connected to the at least one terminal 211 respectively, and the optical transmission system 213 as described in the foregoing embodiments. The at least one terminal 211 is in communication connection with the multiplexer/demultiplexer 2131 in the optical transmission system 213 through the photoelectric conversion device 212.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments.

Accordingly, although specific terms are employed, they are used in a generic and descriptive sense only and not for purposes of limitation.

What is claimed is:

1. An optical transmission system, comprising a first board card comprising a multiplexer/demultiplexer and an optical amplifier, wherein:
   the multiplexer/demultiplexer is configured to receive a plurality of first split optical signals and combine the received plurality of first split optical signals into a first combined optical signal;
   the optical amplifier is configured to amplify power of the first combined optical signal and further configured to receive a second combined optical signal sent externally and amplify power of the second combined optical signal; and
   the multiplexer/demultiplexer is further configured to split the power-amplified second combined optical signal into a plurality of second split optical signals.

2. The optical transmission system according to claim 1, wherein the first board card further comprises an optical protector configured to:
- shunt the power-amplified first combined optical signal into at least two identical combined optical signals, and one-to-one correspondingly output, through at least two output ports of the optical protector, each shunted combined optical signal; and
- receive, through at least two input ports of the optical protector, at least one the second combined optical signal, and input the second combined optical signal to the optical amplifier.

3. The optical transmission system according to claim 1, further comprising a second board card comprising a multiplexing/demultiplexing expander, wherein the first board card and the second board card are located in a same frame;
- the multiplexing/demultiplexing expander is configured to receive at least one first split and expanded optical signal, process the at least one split and expanded optical signal into a first combined and expanded optical signal, and input the first combined and expanded optical signal into the multiplexer/demultiplexer; and the multiplexer/demultiplexer is further configured to combine the first combined and expanded optical signal and the plurality of first split optical signals into the first combined optical signal; and
- the multiplexer/demultiplexer is further configured to split the power-amplified second combined optical signal into the plurality of second split optical signals and a second combined and expanded optical signal, and input the second combined and expanded optical signal into the multiplexing/demultiplexing expander, and the multiplexing/demultiplexing expander is further configured to process the second combined and expanded optical signal into at least one second split and expanded optical signal.

4. The optical transmission system according to claim 3, wherein a frequency band supported by the multiplexer/demultiplexer is different from a frequency band supported by the multiplexing/demultiplexing expander.

5. The optical transmission system according to claim 1, wherein the multiplexer/demultiplexer comprises a multiplexing node and a demultiplexing node;
- the multiplexing node comprises a plurality of first filters, each of the first filters is configured to receive the first split optical signal of a different frequency band, and the plurality of first filters are configured to combine the first split optical signals of different frequency bands into the first combined optical signal; and
- the demultiplexing node comprises a plurality of second filters, the plurality of second filters are configured to split the second combined optical signal into the plurality of second split optical signals of different frequency bands, and each of the second filters is configured to output the second split optical signal of a different frequency band.

6. The optical transmission system according to claim 5, wherein
- each of the first filters comprises a first input port, a second input port, and an output port; the first input port of each of the first filters is configured to receive the first split optical signal of a different frequency band; a plurality of first filters are connected in series, and in two adjacent first filters connected in series, the output port of the first filter at the front is connected to the second input port of the first filter at the rear, and the output port of the first filter ranked last is configured to output a first multiplexed signal; and
- each of the second filters comprises a first output port, a second output port, and an input port; a plurality of second filters are connected in series, and the input port of the second filter ranked first is configured to receive a second multiplexed signal; in two adjacent second filters connected in series, the second output port of the second filter at the front is connected to the input port of the second filter at the rear; and the first output port of each of second filters is configured to output the second split optical signal of a different frequency band obtained by splitting.

7. The optical transmission system according to claim 6, wherein
- the multiplexing node further comprises at least one first expansion filter, wherein each first expansion filter is configured to receive a first split and expanded optical signal, and a frequency band of the first split and expanded optical signal is different from a frequency band of the first split optical signal received by the first input port of each of the first filters, and the at least one first expansion filter is configured to process the received at least one the first split and expanded optical signal into a first combined and expanded optical signal, and input the first combined and expanded optical signal into the second input port of the first filter ranked first; and
- the demultiplexing node further comprises at least one second expansion filter, the plurality of second filters are configured to split the received second multiplexed signal into a plurality of second split optical signals and a combined and expanded optical signal, and output, through the second output port of the second filter ranked last, the second combined and expanded optical signal obtained by splitting to the at least one second expansion filter, the at least one second expansion filter is further configured to process the second combined and expanded optical signal to obtain at least one second split and expanded optical signal, and each second expansion filter is configured to one-to-one correspondingly output the second split and expanded optical signal; and a frequency band of the second split and expanded optical signal is different from the frequency band of the second split optical signal output by the first output port of each of the second filters.

8. The optical transmission system according to claim 6, wherein in two adjacent first filters connected in series, a frequency band of the first split optical signal received by the first input port of the first filter at the front is smaller than a frequency band of the first split optical signal received by the first input port of the first filter at the rear.

9. The optical transmission system according to claim 6, wherein
- in two adjacent first filters connected in series, in a case where the frequency band of the first split optical signal received by the first input port of the first filter at the front is smaller than the frequency band of the first split optical signal received by the first input port of the first filter at the rear, in two adjacent second filters connected in series, a frequency band of the second split optical signal output by the first output port of the second filter at the front is smaller than a frequency band of the second split optical signal output by the first output port of the second filter at the rear; and
- in two adjacent first filters connected in series, in a case where the frequency band of the first split optical signal received by the first input port of the first filter at the front is larger than the frequency band of the first split optical signal received by the first input port of the first filter at the rear, in two adjacent second filters connected in series, a frequency band of the second split optical signal output by the first output port of the second filter at the front is larger than a frequency band of the second split optical signal output by the first output port of the second filter at the rear.

* * * * *